United States Patent
Corston-Oliver et al.

(10) Patent No.: US 6,295,529 B1
(45) Date of Patent: Sep. 25, 2001

(54) METHOD AND APPARATUS FOR INDENTIFYING CLAUSES HAVING PREDETERMINED CHARACTERISTICS INDICATIVE OF USEFULNESS IN DETERMINING RELATIONSHIPS BETWEEN DIFFERENT TEXTS

(75) Inventors: Simon H. Corston-Oliver, Seattle; William B. Dolan, Redmond, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/220,836

(22) Filed: Dec. 24, 1998

(51) Int. Cl.[7] ............................ G06F 17/30; G06F 15/21; G10L 1/10
(52) U.S. Cl. ................................. 707/3; 707/9; 707/266
(58) Field of Search ................... 707/3, 34, 10, 707/500, 529; 709/203; 704/9, 266, 263, 257

(56) References Cited

U.S. PATENT DOCUMENTS

| | | | |
|---|---|---|---|
| 3,704,345 | * 11/1972 | Coker et al. | 704/266 |
| 4,994,966 | * 2/1991 | Hutchins | 704/9 |
| 5,845,278 | * 12/1998 | Kirsch et al. | 707/3 |
| 5,859,972 | * 1/1999 | Subramaniam et al. | 709/203 |
| 5,873,081 | * 2/1999 | Harel | 707/3 |
| 5,920,854 | * 7/1999 | Kirsch et al. | 707/3 |
| 6,018,733 | * 1/2000 | Subramaniam et al. | 707/3 |

OTHER PUBLICATIONS

"A surface–based approach to identifying discourse markers and elementary textual units in unrestricted texts", by Daniel Marcu, Information Services Institute, University of Southern California, 1998.

"The Rhetorical Parsing, Summarization, and Generation of Natural Language Texts", by Daniel Marcu, Dec. 1997, Department of Computer Science, University of Toronto, Toronto, Canada.

* cited by examiner

*Primary Examiner*—Thomas Black
*Assistant Examiner*—Te Yu Chen
(74) *Attorney, Agent, or Firm*—Joseph R. Kelly; Westman, Champlin & Kelly, P.A.

(57) ABSTRACT

A system is utilized for determining a relationship between first and second textual inputs. The system identifies clauses in the first textual input having predetermined characteristics indicative of usefulness in determining the relationship. The relationship is then determined based on the clauses identified. The clauses can be eliminated from the first textual input, weighted in the first textual input, or simply annotated.

27 Claims, 9 Drawing Sheets

FIG._1
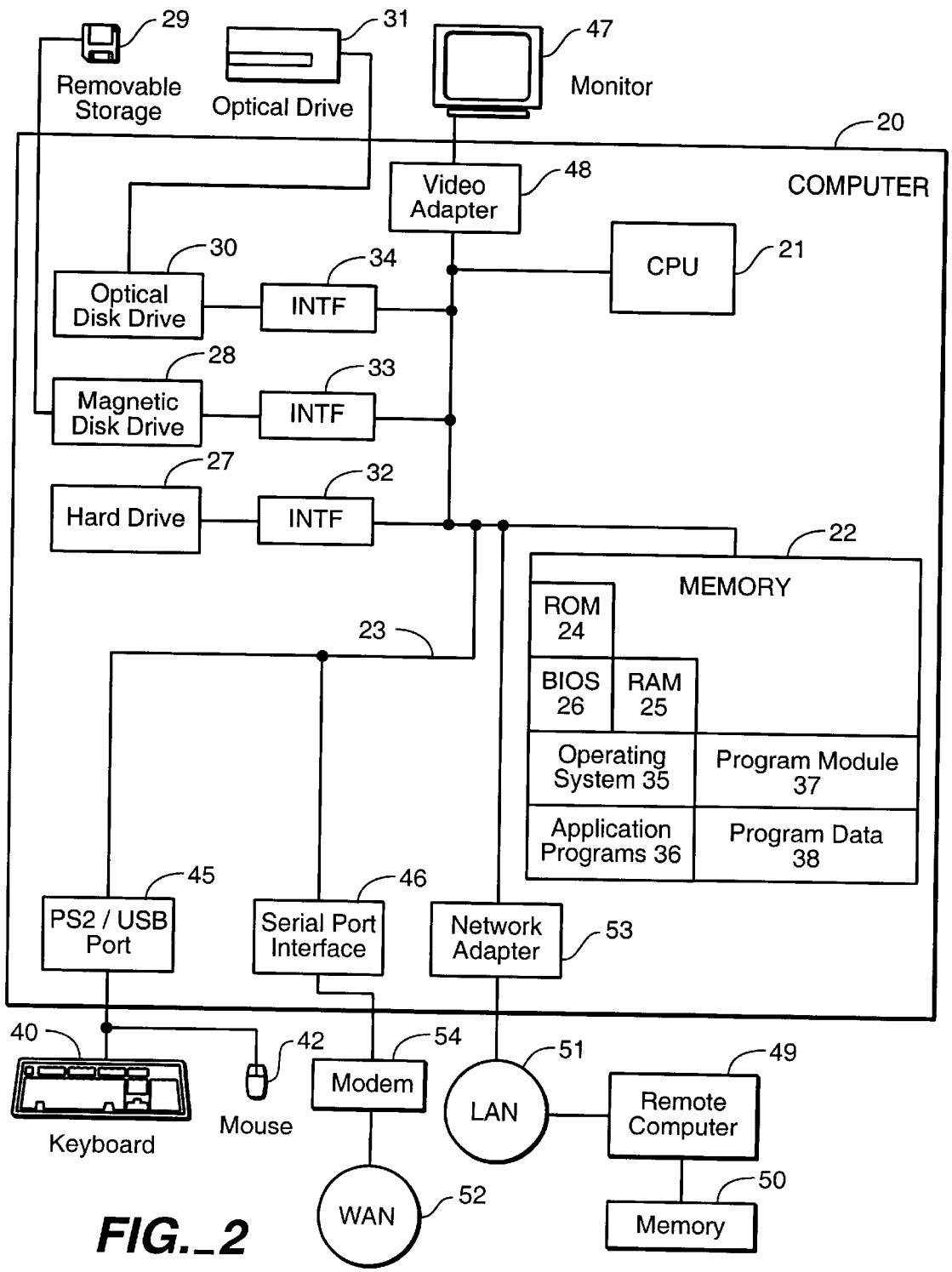
FIG._2

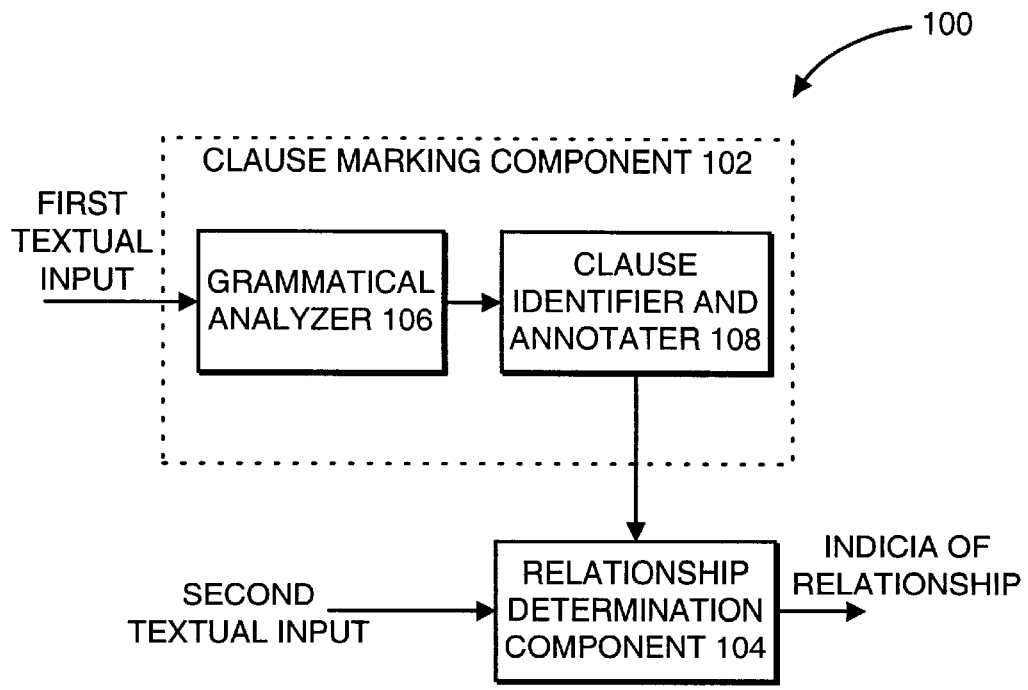
FIG._3A
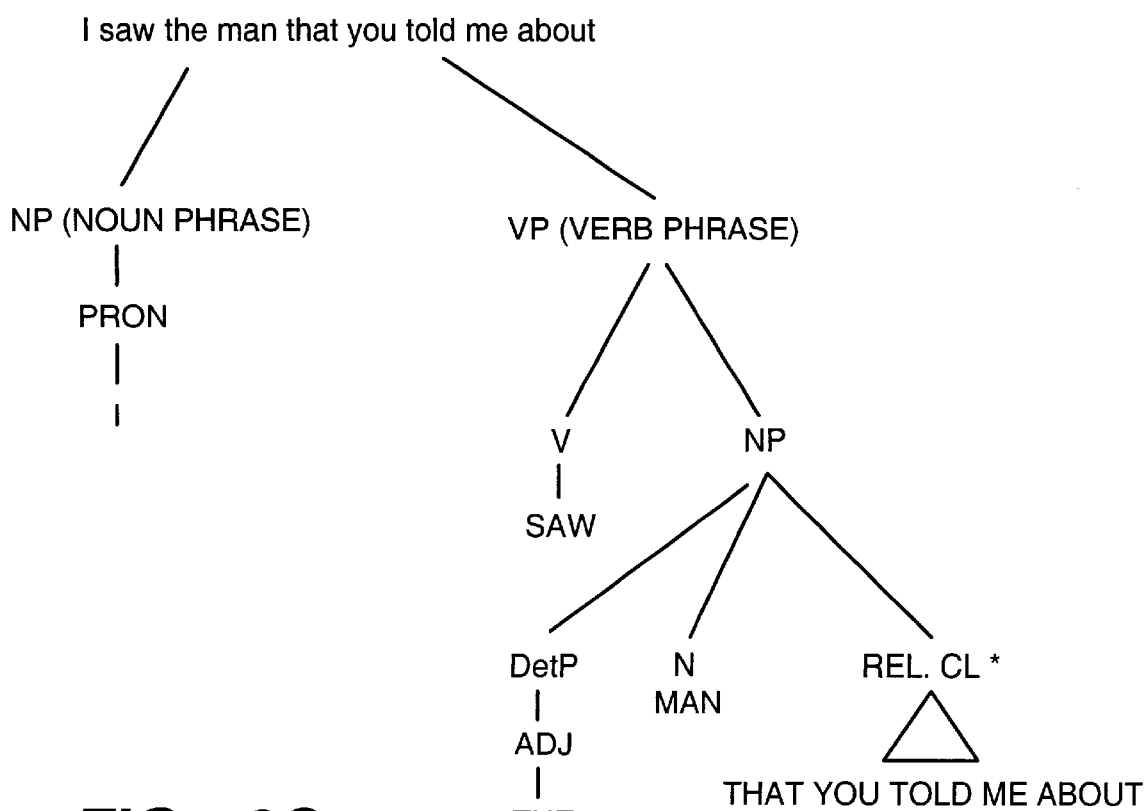
FIG._3C

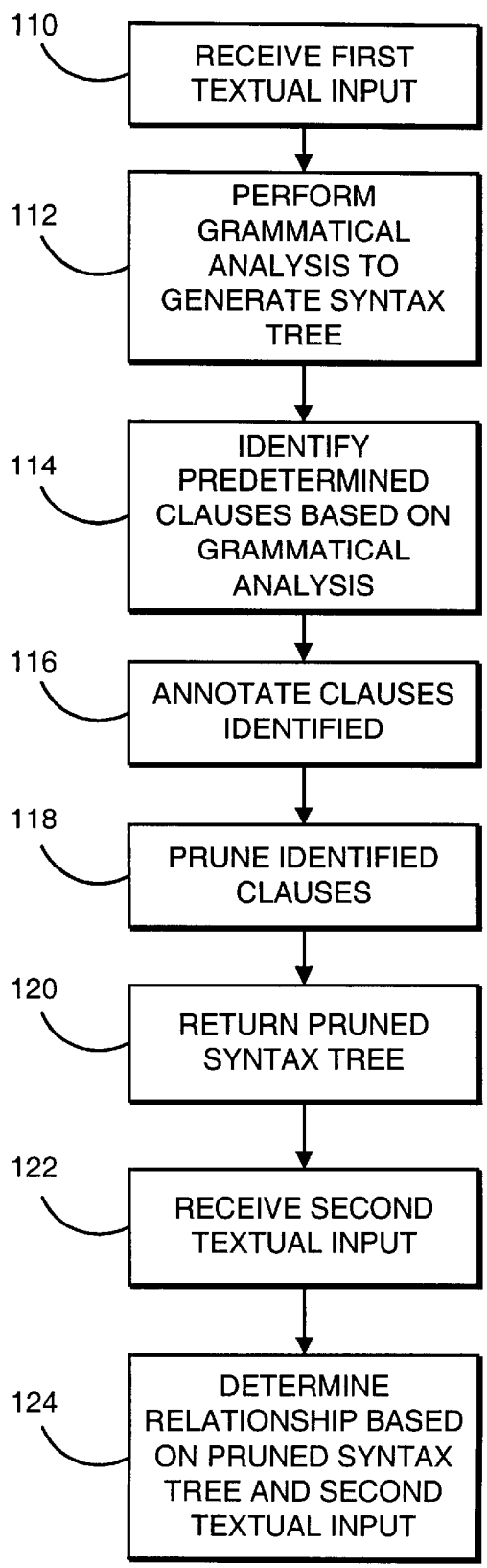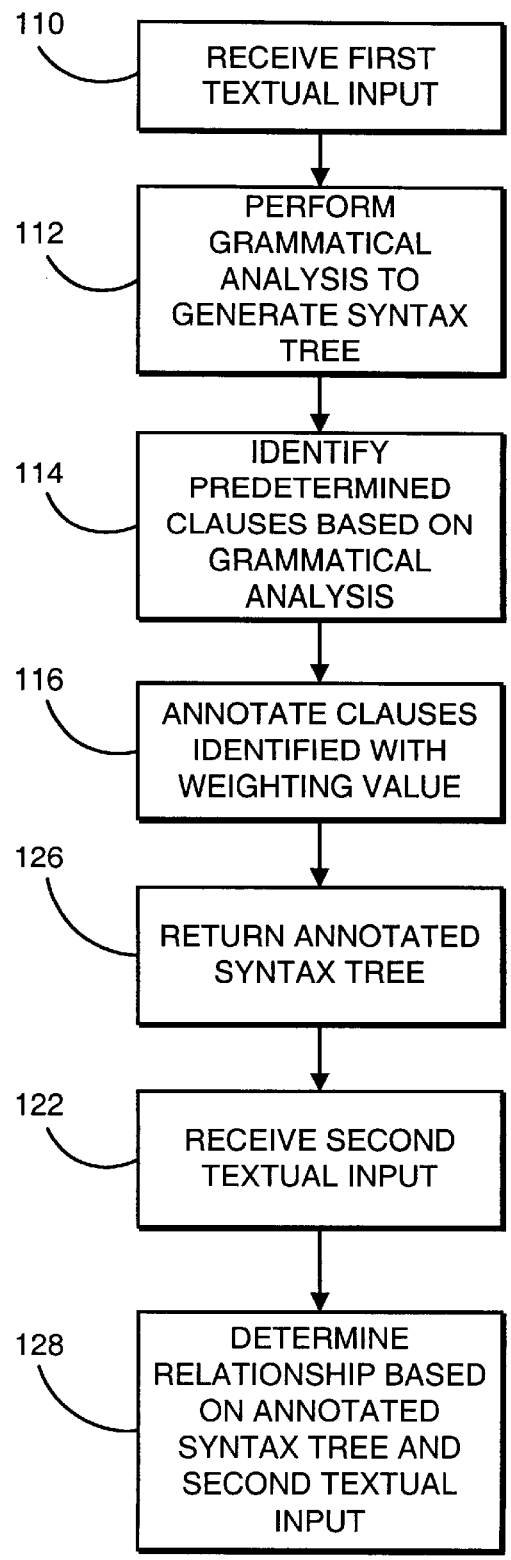
FIG._3B          FIG._4

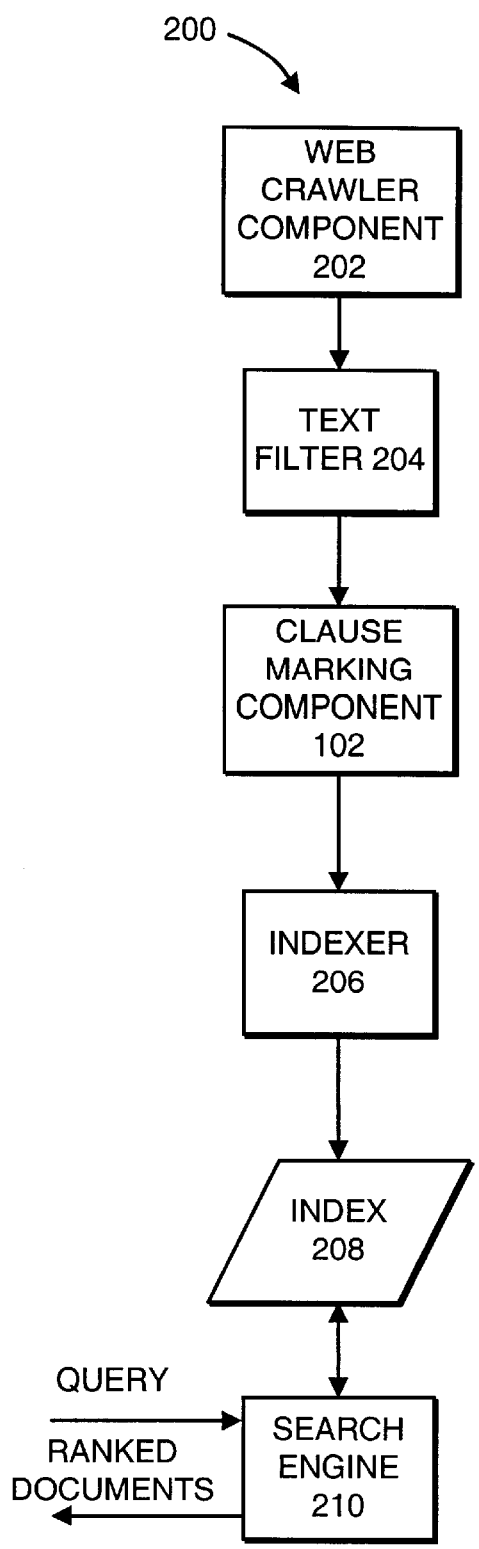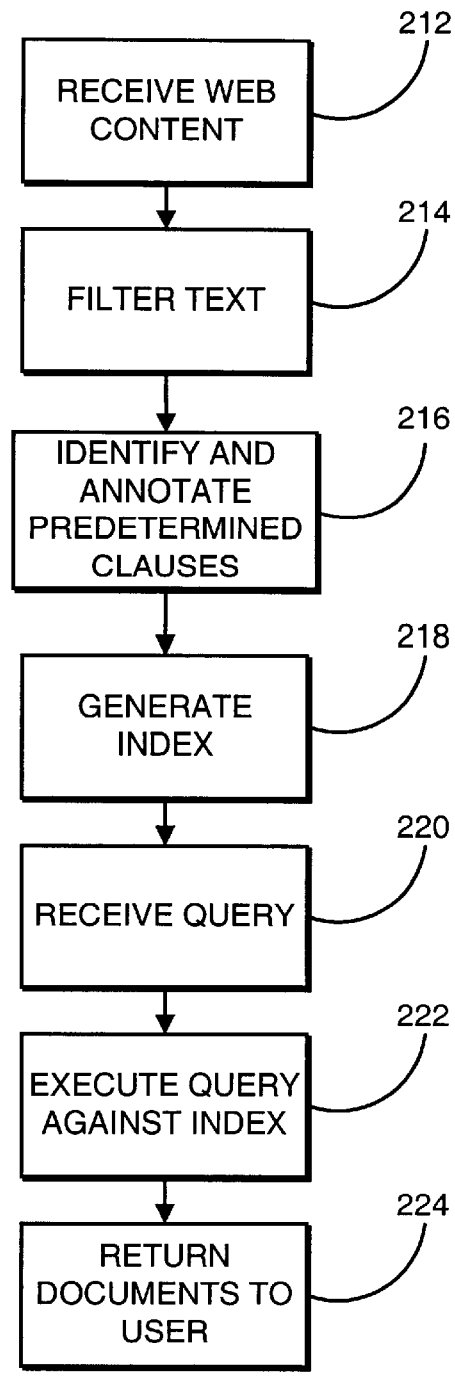
*FIG._5A*  *FIG._5B*

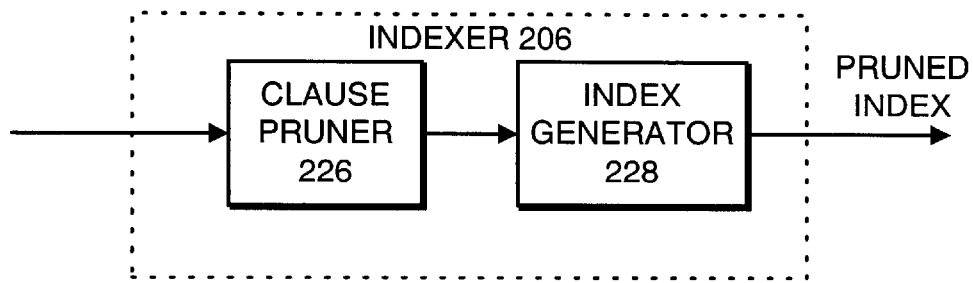
FIG._5C
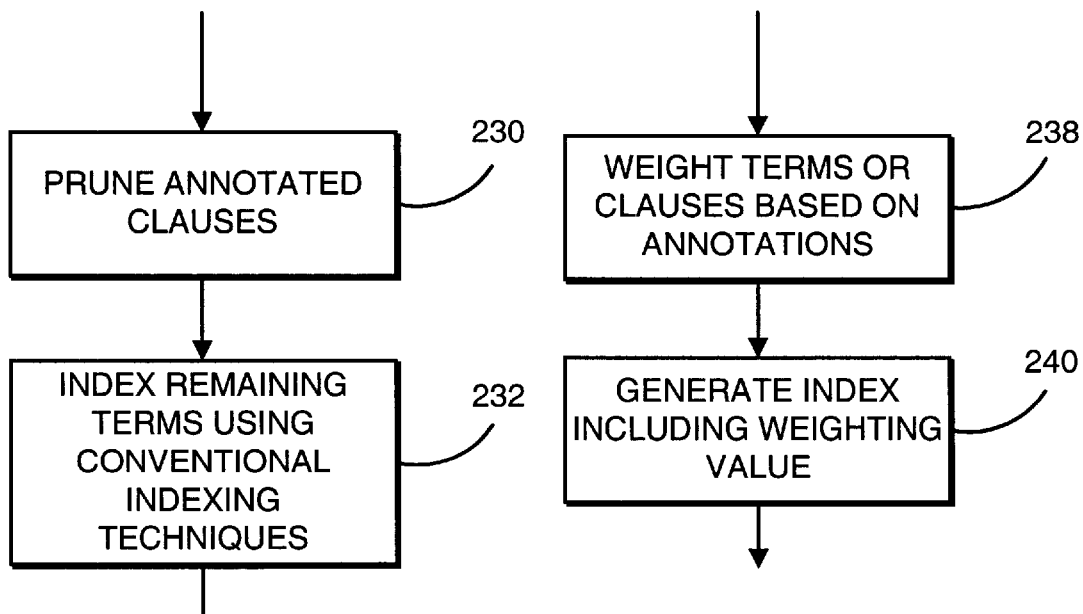
FIG._5D
FIG._5F
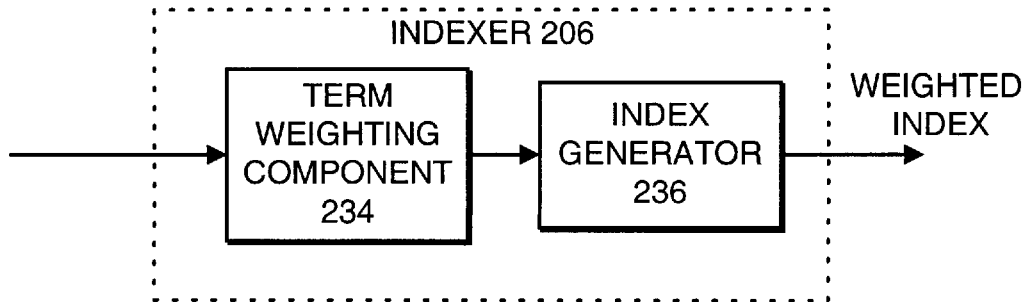
FIG._5E

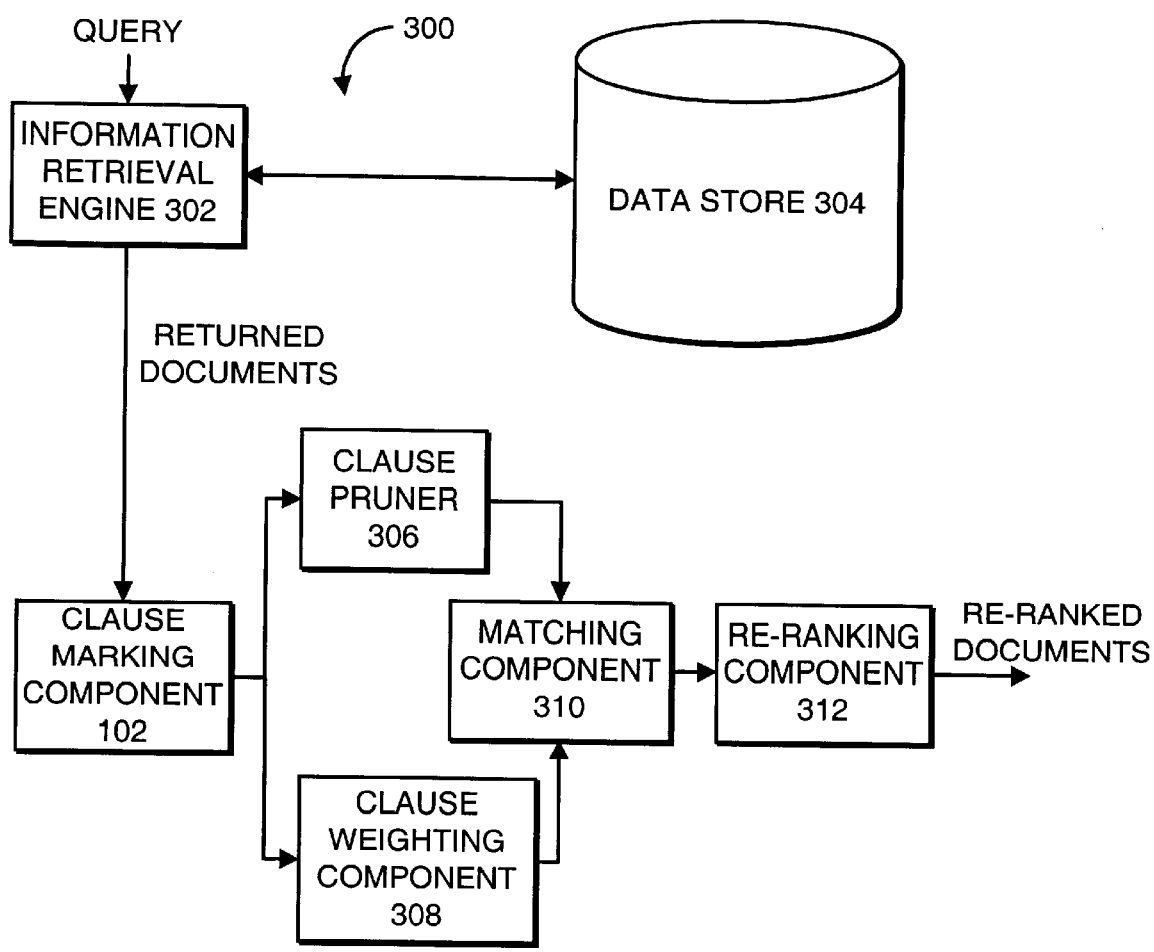
FIG._6A

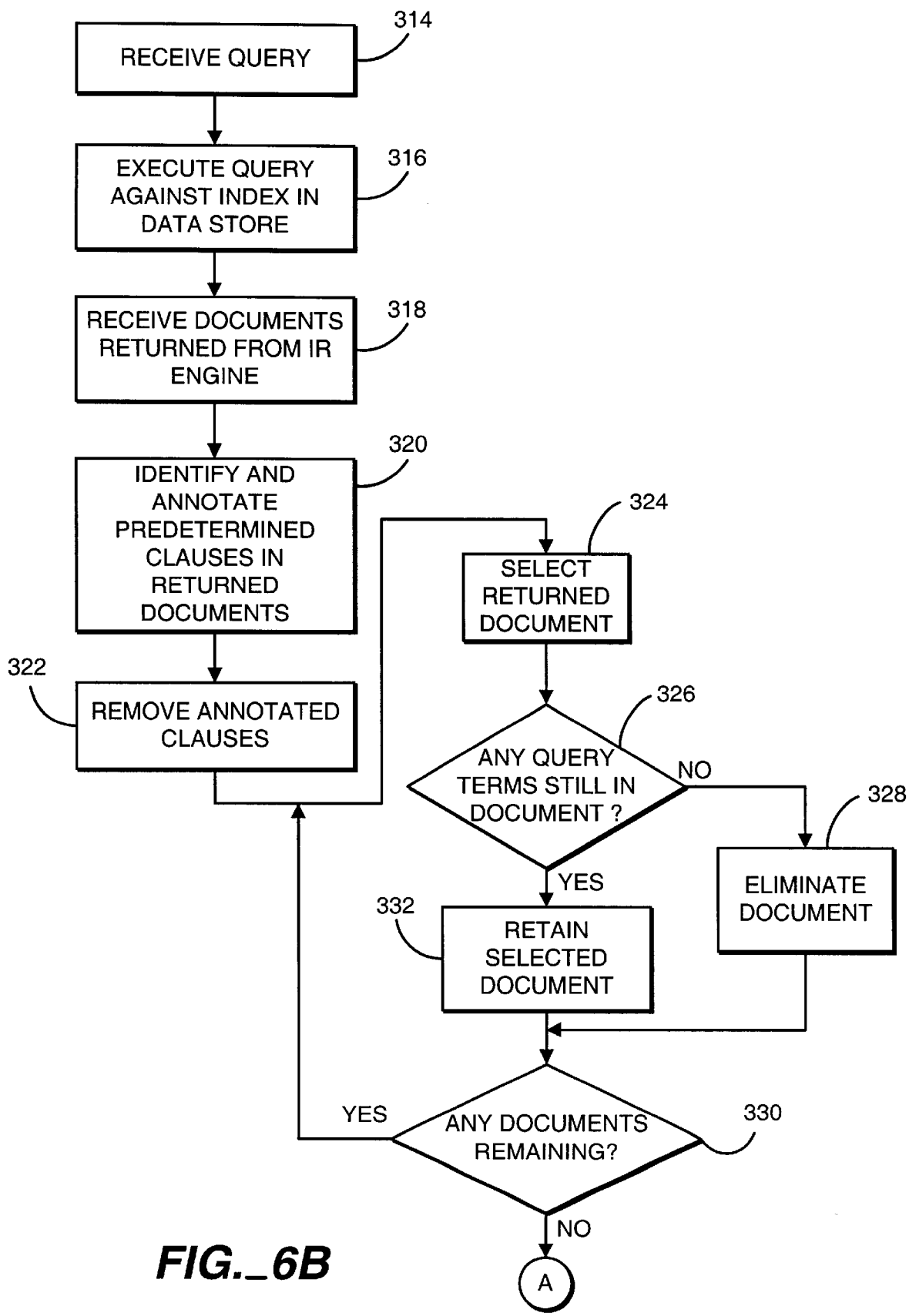
FIG._6B

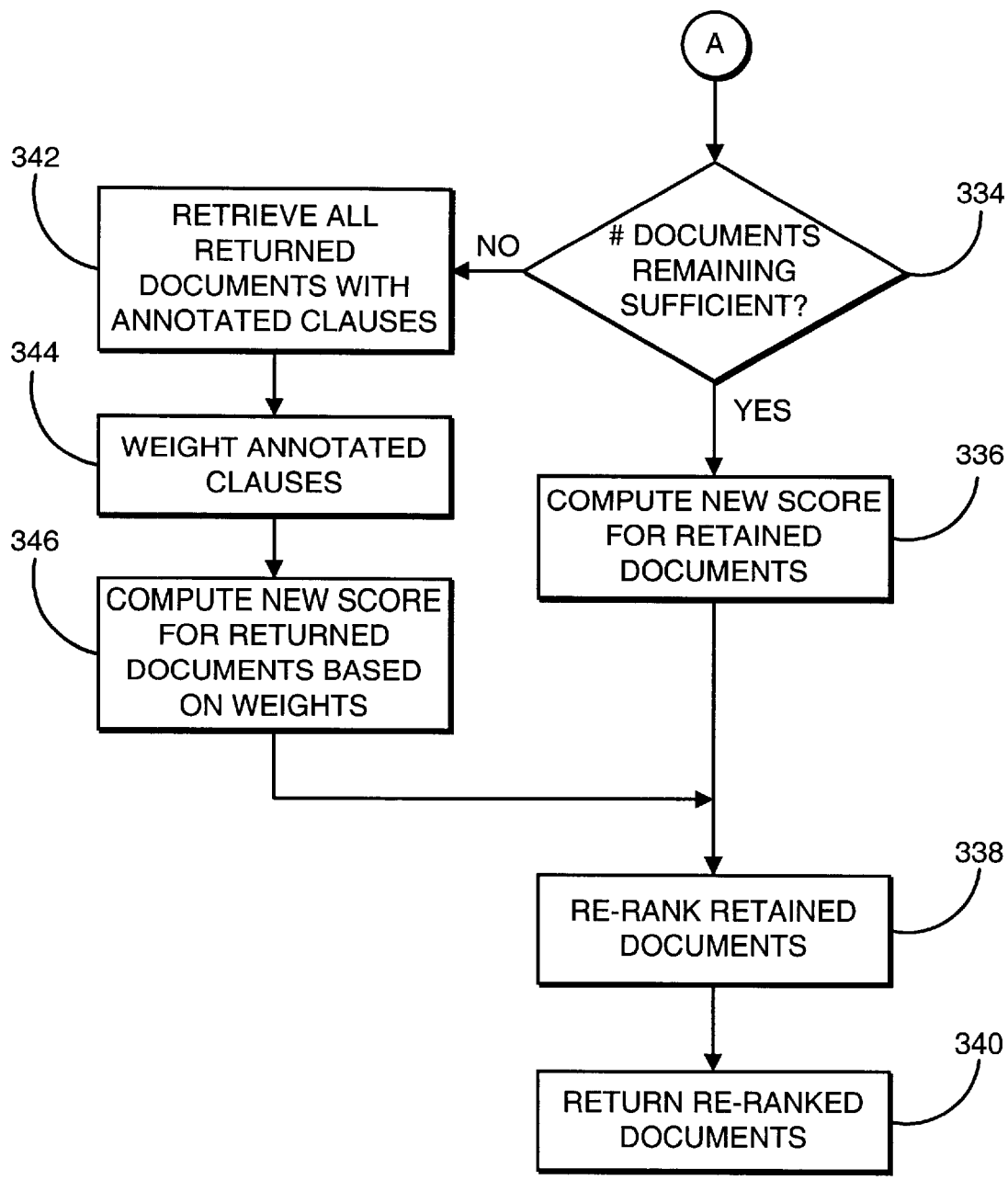
FIG._6C

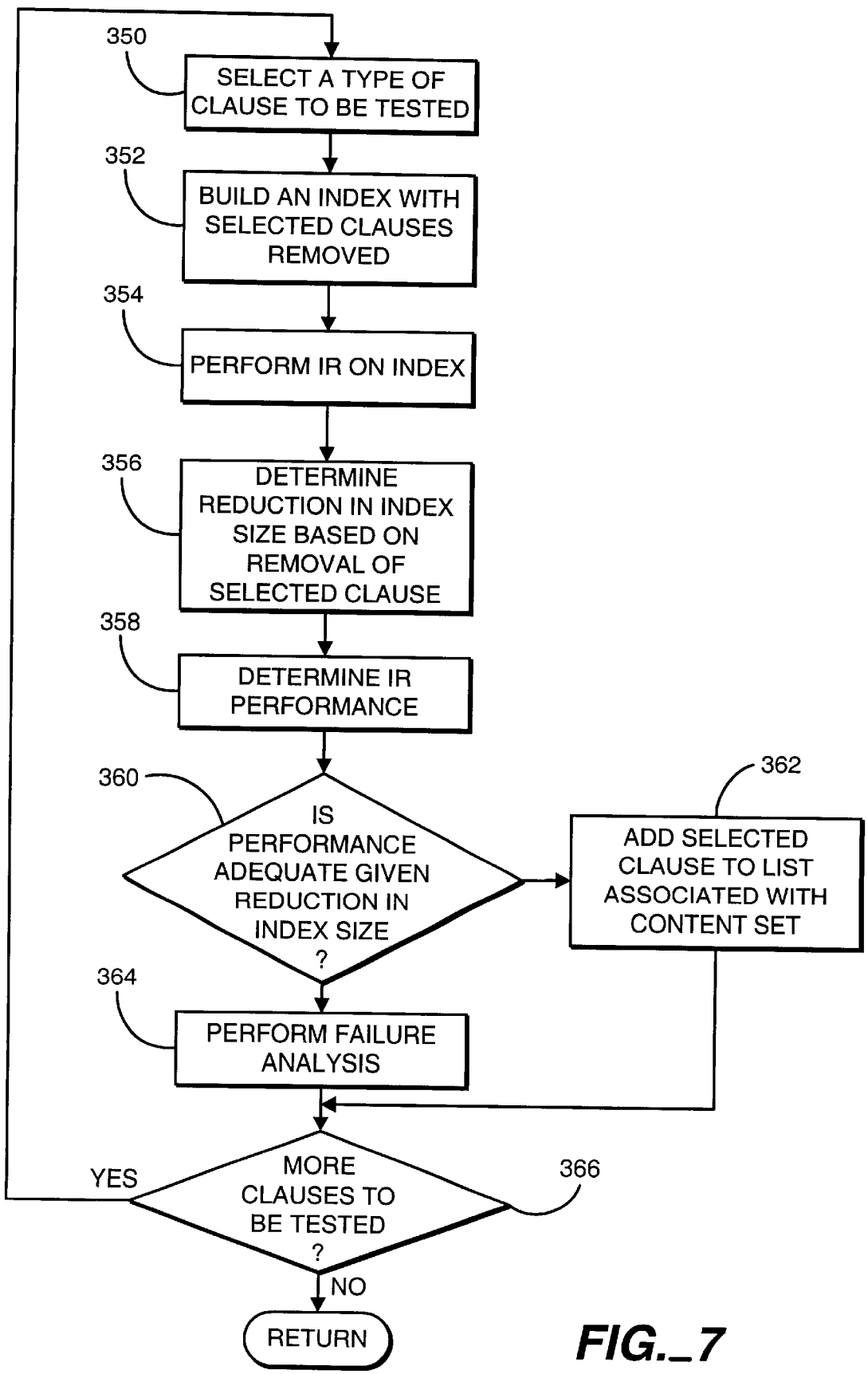
FIG._7

METHOD AND APPARATUS FOR INDENTIFYING CLAUSES HAVING PREDETERMINED CHARACTERISTICS INDICATIVE OF USEFULNESS IN DETERMINING RELATIONSHIPS BETWEEN DIFFERENT TEXTS

BACKGROUND OF THE INVENTION

The present invention is directed to a system for determining a relationship (such as similarity in meaning) between two or more textual inputs. More specifically, the present invention is directed to a system which performs improved information retrieval-type tasks by identifying clauses in documents being searched having certain predetermined characteristics.

The present invention is useful in a wide variety of applications, such as many aspects of information retrieval including indexing, pre-query and post-query processing, document similarity/clustering, document summarization, natural language understanding, etc. However, the present invention will be described primarily in the context of information retrieval, for illustrative purposes only.

Generally, information retrieval is a process by which a user finds and retrieves information, relevant to the user, from a large store of information. In performing information retrieval, it is important to retrieve all of the information a user needs (i.e., it is important to be complete) and at the same time it is important to limit the irrelevant information that is retrieved for the user (i.e., it is important to be selective). These dimensions are often referred to in terms of recall (completeness) and precision (selectivity). In many information retrieval systems, it is important to achieve good performance across both the recall and precision dimensions.

In some current retrieval systems, the amount of information that can be queried and searched is very large. For example, some information retrieval systems are set up to search information on the Internet, digital video discs, and other computer data bases in general. The information retrieval systems are typically embodied as, for example, Internet search engines and library catalog search engines. Further, even within the operating system of a conventional desktop computer, certain types of information retrieval mechanisms are provided. For example, some operating systems provide a tool by which a user can search all files on a given data base or on a computer system based upon certain terms input by the user.

Many information retrieval techniques are known. A user input query in such techniques is typically presented as either an explicit user generated query, or an implicit query, such as when a user requests documents which are similar to a set of existing documents. Typical information retrieval systems search documents in a larger data store at either a single word level, or at a term level. Each of the documents is assigned a relevance (or similarity) score, and the information retrieval system presents a certain subset of the documents searched to the user, (typically that subset which has a relevance score which exceeds a given threshold).

The rather poor precision of conventional statistical search engines stems from their assumption that words are independent variables, i.e., words in any textual passage occur independently of each other. Independence in this context means that a conditional probability of any one word appearing in a document given the presence of another word therein is always zero, i.e., a document simply contains an unstructured collection of words or simply put "a bag of words".

As one can readily appreciate, this assumption, with respect to any language, is grossly erroneous. Words that appear in a textual passage are simply not independent of each other. Rather, they are highly inter-dependent.

Keyword based search engines totally ignore this fine-grained linguistic structure. For example, consider an illustrative query expressed in natural language: "How many hearts does an octopus have?" A statistical search engine, operating on content words "hearts " and "octopus", or morphological stems thereof, might likely return or direct a user to a stored document that contains a recipe that has as its ingredients and hence its content words: "artichoke hearts, squid, onion and octopus". This engine, given matches in the two content words, may determine, based on statistical measures, that this document is an excellent match. In reality, the document is quite irrelevant to the query.

The art also teaches various approaches for extracting elements of syntactic phrases which are indexed as terms in a conventional statistical vector-space model. One example of such an approach is taught in J. L. Fagan, "Experiments in Automatic Phrase Indexing for Document Retrieval: A Comparison of Syntactic and Non-Syntactic Methods", Ph.D. Thesis, Cornell University, 1988, pp. 1–261. Another such syntactic based approach is described, in the context of using natural language processing for selecting appropriate terms for inclusion within search queries, in T. Strzalkowski, "Natural Language Information Retrieval: Tipster-2 Final Report", *Proceedings of Advances in Text Processing: Tipster Program Phase* 2, Darpa, May 6–8 1996, Tysons Corners, Va., pp. 143–148; and T. Strzalkowski, "Natural Language Information Retrieval", *Information Processing and Management,* Vol. 31, No. 3, 1995, pp. 397–417. A further syntactic-based approach of this sort is described in B. Katz, "Annotating the World Wide Web Using Natural Language", *Conference Proceedings of R.I.A.O. 97, Computer-Assisted Information Search on Internet,* McGill University, Quebec, Canada, Jun. 25–27 1997, Vol. 1, pp., 135–155.

These syntactic approaches have yielded lackluster improvements, or have not been feasible to implement in natural language processing systems available at the time. Therefore, the field has moved away from attempting to directly improve the precision and recall associated with the results of a query, to improvements in the user interface.

Another problem is also prevalent in some information retrieval systems. For example, where documents are indexed, such as in a typical statistical search engine, the index can be very large, depending upon the content set, and number of documents to be indexed. Large indices not only present storage capacity problems, but can also increase the amount of time required to execute a query against the index.

SUMMARY OF THE INVENTION

A system is utilized for determining a relationship between first and second textual inputs. The system identifies clauses in the first textual input having predetermined characteristics indicative of usefulness in determining the relationship. The relationship is then determined based on the clauses identified. The clauses can be eliminated from the first textual input, weighted in the first textual input, or simply annotated.

One embodiment of the invention includes a test methodology which is used in identifying the clauses having predetermined characteristics. The test methodology can be used across a wide variety of content sets, in order to customize the present invention for use with the various content sets.

BRIEF DESCRIPTION OF THE DRAWINGS

FIG. 1 is a high level block diagram of an illustrative system in which the present invention can be used.

FIG. 2 is a block diagram of one embodiment of a computer in accordance with one aspect of the present invention.

FIG. 3A is a functional block diagram illustrating operation of one aspect of the present invention, in accordance with one illustrative embodiment thereof.

FIG. 3B is a flow diagram illustrating operation of the system shown in FIG. 3A.

FIG. 3C is a syntax tree generated in accordance with one embodiment of the present invention.

FIG. 4 is a flow diagram illustrating the operation of the system shown in FIG. 3A in accordance with another embodiment of the present invention.

FIG. 5A is a functional block diagram illustrating another system in which the present invention can be used.

FIGS. 5B–5F are flow and block diagrams illustrating the operation of the system shown in FIG. 5A.

FIG. 6A is a block diagram illustrating another system in which the present invention can be used.

FIGS. 6B and 6C are flow diagrams illustrating the operation of the system shown in FIG. 6A in accordance with one embodiment of the present invention.

FIG. 7 is a flow diagram illustrating a test methodology used in accordance with one embodiment of the present invention.

DETAILED DESCRIPTION OF THE ILLUSTRATIVE EMBODIMENTS

Overview

The present invention utilizes grammatical relations between terms or phrases in a first textual input in order to determine the meaning or "aboutness" of the first textual input. In accordance with one illustrative embodiment of the present invention, the grammatical relations are determined by identifying certain clauses which are not particularly helpful in determining the aboutness of the first textual input. While the present invention is contemplated for use in a wide variety of applications, it is described herein, primarily in the context of information retrieval, for the purpose of illustration only. In that context, the predetermined clauses which have been identified can be removed from the first textual input prior to an indexing operation to greatly reduce the size of the index. This can be accomplished without significantly impacting either precision or recall during the information retrieval process. The present invention also includes a system for obtaining a list of the clauses to be identified, certain data structures and systems for generating those data structures.

FIG. 1 depicts a very high-level block diagram of computer system 10 in accordance with one illustrative embodiment of the present invention. Computer system 10 includes data store 12 coupled to computer 20. It should be noted that data store 12 can be any suitable type of storage which is either internal to or external to, computer 20. Similarly, data store 12 can be coupled to computer 20 through any suitable means, such as through direct cabling, a dial-up modem connection (such as when data store 12 corresponds to memory accessible over a global computer network such as the Internet), or any other suitable connection. Similarly, computer 20 is illustratively any suitable computer for accessing data store 12, and is referred to hereinafter as a personal computer which is described in greater detail with respect to FIG. 2.

Computer 20 includes user interface devices (such as a keyboard and monitor) so that a user can provide a user input to computer 20 in order to request that computer 20 perform certain operations on data store 12.

The user input can be a request to perform an information retrieval operation. In doing so, the user input is typically a query and computer 20 executes the query against data store 12 to locate documents which are relevant to the query input by the user. In that case, computer 20 determines a relationship between the first textual input (which is the query) and a second textual input (which is one or more of the documents under consideration or indexed records of those documents) and identifies those documents which have a close relationship (such as those documents which are similar in meaning) to the query and provides the identification of those documents, or the documents themselves, as an output to the user.

The user input can also be an implicit type of information retrieval request. In that case, the user typically presents a document or other textual input and requests computer 20 to execute a "FIND SAME" type of operation in which computer 20 locates documents on data store 12 which are similar to the textual input provided by the user. Computer 20 then provides either an identification of the documents located in response to the "FIND SAME" request, or the documents themselves.

Similarly, the user input can include a request to cluster documents, in which case computer 20 examines a plurality of documents on data store 12 and clusters like documents in the same clusters. In doing so, computer 20 determines a relationship (such as similarity in meaning) between the various documents and places those documents which are closely related to one another in the same cluster.

The user input can also be a request that computer 20 summarize one or more documents contained in data store 12. In that instance, computer 20 examines the documents under consideration and develops an output to the user which is indicative of the meaning or "aboutness" of the document being summarized.

In all of the above instances, it should be noted that the operations described can either be carried out across a network (either a local area network or a wide area network) or they can be carried out within a single computer (such as where the operating system provides a searching tool which can be used to search the memory of the computer on which the operating system is running).

FIG. 2 is a more detailed block diagram of computer 20 in accordance with one illustrative embodiment of the present invention. FIG. 2 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including handheld devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

In FIG. 2, an exemplary system for implementing the invention includes a general purpose computing device in the form of a conventional personal computer 20, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 a random access memory (RAM) 25. A basic input/output 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 45 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices such as a speaker and printers (not shown).

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local are network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

Identifying Clauses Based on Grammatical Relations

FIG. 3A is a functional block diagram of a text processing system 100 in accordance with one illustrative embodiment of the present invention. The components in system 100 can be implemented based on program modules or instructions stored in any suitable memory associated with, or accessible by, computer 20. Further, the components can be implemented in processor 21, a co-processor, or a dedicated processor.

Text processing system 100 includes clause marking component 102 and relationship determination component 104. Clause marking component 102 receives a first textual input and identifies predetermined clauses in the first textual input, which are described in greater detail below, and annotates those clauses so that they can be identified during later processing. The annotated clauses are provided, in one illustrative embodiment, as an annotated syntax tree, to relationship determination component 104. In an embodiment in which system 100 is being used to determine the relationship between two or more textual inputs, relationship determination component 104 determines a relationship between the annotated syntax tree output by clause marking component 102 and a second textual input provided to component 104. Component 104 provides an indication of the relationship at its output.

In order to identify and annotate the predetermined clauses, clause marking component 102 includes grammatical analyzer 106, and clause identifier and annotator 108. The first textual input is provided to grammatical analyzer 106. In one illustrative embodiment, grammatical analyzer 106 simply includes a sentence breaker which examines the first textual input provided thereto and breaks the document along sentence boundaries. The sentences are provided to a syntactic analyzer (also included in grammatical analyzer 106) which identifies parts of speech (such as noun, verb), phrases (such as noun phrase, verb phrase) and grammatical relations (such as subjects and objects) of terms in the sentence and provides an output. It should be noted that the grammatical analysis illustratively includes a syntax tree generator or other dependency analyzer and provides the output, such as a syntax tree structure which corresponds to the sentence received by the syntactic analyzer. The syntax tree structure is provided to clause identifier 108. It should also be noted that grammatical analyzer 106 can be a more complicated system which includes a morphological analysis, or other natural language process parsing techniques as well.

For example, in accordance with one embodiment of the present invention, the syntactic analyzer in grammatical analyzer 106 receives a single line of input text at any given time, whether it be a sentence in a document or a text fragment and constructs the syntax parse tree which is output by the grammatical analyzer 106. In one illustrative example, where documents are being analyzed, in order to facilitate natural language processing which operates on a single sentence at time, the text for each document is broken into a text file using a conventional sentence breaker in which each sentence (or question) occupies a separate line in the file. For each input text line, the line is first parsed into its constituent words. Thereafter, using a predefined record in a stored lexicon, for each word, the corresponding records for these constituent words (through predefined grammatical rules) are themselves combined into larger structures or analyses which are then, in turn, combined (again through predefined grammatical rules) to form even larger structures, such as a syntax parse tree. Whether a particular rule will be applicable to a particular set of constituents is governed, in part, by the presence or absence of certain corresponding attributes and their values in the word records.

An illustrative lexicon includes approximately 165,000 head word entries. This lexicon includes various classes of words (such as, e.g., prepositions, conjunctions, verbs, nouns, operators and qualifiers) that define syntactic and semantic properties inherent in the words in an input string so that a parse tree can be constructed therefore. Clearly, a syntax parse tree can be precomputed while a corresponding document is being indexed and stored within a record for that document for subsequent access and use, rather than being computed later once that document has been retrieved in response to a query.

In one particular illustrative embodiment of grammatical analyzer 106, an input string, such as the sentence "The octopus has three hearts." is first morphologically analyzed, using the predefined record in the lexicon for each of its constituent words, to generate a so-called "stem " (or "base") form. Stem forms are used in order to normalize differing word forms (e.g., verb tense and singular-plural noun variations) to a common morphological form for use by a parser. Once the stem forms are produced, the input string is syntactically analyzed by the parser, using the grammatical rules and attributes in the records of the constituent words, to yield the corresponding syntactic parse tree. This tree depicts the structure of the input string, specifically each word or phrase (e.g. noun phrase "The octopus") in the input string, a category of its corresponding grammatical function (e.g., NP for noun phrase) and link(s) to each syntactically related word or phrase therein. For the illustrative sentence, its associated syntactic parse tree would be:

TABLE 1

SYNTACTIC PARSE TREE

DECL
- NP — DETP-ADJ* "The"
   — NOUN* "octopus"
- VERB* has
- NP — QUANP-ADJ* "three"
   — NOUN* "hearts"
- CHAR "."

for "The octopus has three hearts."

A start node located in the upper-left hand corner of the tree defines the type of input string being parsed. Sentence types include "DECL" (as here) for a declarative sentence, "IMPR" for an imperative sentence and "QUES" for a question. Displayed vertically to the right and below the start node is a first level analysis. This analysis has a head node indicated by an asterisk (or other suitable marker), typically a main verb (here the word "has"), a premodifier (here the noun phrase "The octopus"), followed by a postmodifier (the noun phrase "three hearts"). Each leaf of the tree contains a lexical term or a punctuation mark. Here, as labels, "NP" designates a noun phrase, and "CHAR" denotes a punctuation mark.

For further details in this regard, the reader is referred to co-pending U.S. patent applications entitled "METHOD AND SYSTEM FOR COMPUTING SEMANTIC LOGICAL FORMS FROM SYNTAX TREES", filed Jun. 28, 1996 and assigned Ser. No. 08/674,610 and particularly information retrieval utilizing semantic representation of text, filed Mar. 7, 1997 and assigned Ser. No. 08/886,814, both of which have been assigned to the present assignee and incorporated by reference herein.

Further, while an illustrative embodiment of the present invention uses natural language parsing in order to identify clause types in generating a syntactic parse tree, other systems can be used to identify certain clause types. Certain string pattern matching techniques can be used to identify clauses. Such string pattern matching techniques have been described by Daniel Marcu in 1998 in a paper entitled "A SURFACE-BASED APPROACH TO IDENTIFYING DISCOURSE MARKERS AND ELEMENTARY TEXTUAL UNITS IN UNRESTRICTED TEXTS.", the coling/ACL 98 Workshop on Discourse Relations and Discourse Markers, Montreal, Canada, August 1998. This paper is essentially a summary of the relevant chapters of a dissertation written by Daniel Marcu in 1997 entitled "THE RETORICAL PARSING, SUMMARIZATION, AND GENERATION IN NATURAL LANGUAGE TEXTS." Ph.D. Thesis, Department of Computer Science, University of Toronto, December 1997. This dissertation is also published as Technical Report CSRG-371, Computer Systems Research Group, University of Toronto.

The output of grammatical analyzer (illustratively a syntax tree corresponding to the sentence under analysis) is provided to clause identifier and annotator 108. In one illustrative embodiment, clause identifier and annotator 108 includes a list of the predetermined types of clauses to be identified. In one illustrative embodiment, the predetermined clauses to be identified include a predetermined subset of subordinate clauses identified by clause type. Thus, clause identifier and annotator 108 includes a software component which walks the syntax tree provided by grammatical analyzer 106 looking for clauses contained in the list of predetermined clause types. Upon identifying a clause type in a sentence passed to the clause identifier and annotator 108, component 108 annotates the clause to indicate that it is a clause which is contained in the list of predetermined clause types.

In accordance with one aspect of the present invention, the predetermined clause types are clauses which have been empirically determined to be of little or no use in determining what the overall document or sentence is about. For example, in many instances, a main clause in a sentence tends to correspond to a reader's intuitive reading of what the document is about, while a subordinate clause does not. However, there are many exceptions to that general rule. Therefore, in accordance with one illustrative embodiment of the present invention, all subordinate clauses are not identified as members of the predetermined set, but a subset of subordinate clauses are so identified. Such clauses can be empirically identified according to a suitable test methodology, one of which is described below in greater detail with respect to FIG. 7.

In any case, once the predetermined clause types have been annotated, the annotated structure (such as an annotated syntax tree) is passed to relationship determination component 104. In the embodiment illustrated in FIG. 3A, component 104 is determining a predetermined relationship between the first textual input provided to grammatical analyzer 106 and a second textual input provided to component 104. In one illustrative embodiment, the relationship to be determined is the similarity in meaning between the first and second textual inputs.

In performing that task, component 104 takes into account the annotated clauses in the syntax tree provided by clause marking component 102. For example, component 104 can simply eliminate the annotated clauses and determine a degree of similarity between the first textual input (with the annotated clauses deleted) and the second textual input. This reduces the amount of comparison and processing required, since the overall text in the first textual input is reduced. Weighting techniques can also be used and are described in greater detail later in the application.

FIG. 3B is a flow diagram illustrating the operation of system 100 illustrated in FIG. 3A in greater detail. First, grammatical analyzer 106 receives the first textual input. This is indicated by block 110. In one illustrative embodiment, the first textual input is a document under analysis. Grammatical analyzer 106 breaks the document at sentence boundaries. In addition, in one illustrative embodiment, grammatical analyzer may contain a morphological analysis component, or contain no such component, but simply contains a component which identifies subordinate clauses and also identifies the type of subordinate clauses in each sentence. Such a component also, illustratively, creates a syntax tree corresponding to each sentence. This is indicated by block 112.

FIG. 3C illustrates a syntax tree corresponding to the sentence:

"I saw the man that you told me about."

In FIG. 3C, the sentence under analysis is first broken into a noun phrase (NP) and a verb phrase (VP). The noun phrase contains the pronoun "I" and the verb phrase contains everything in the sentence after the noun phrase. The verb phrase is further broken up into a verb "saw" and a noun phrase wherein the noun phrase includes a determiner phrase (DetP) and adjective (adj) "the". The noun phrase includes the noun "man" and the remainder of the noun phrase is a relative clause "that you told me about."

Having generated the syntax tree illustrated in FIG. 3C, grammatical analyzer 106 passes the syntax tree to clause identifier and annotator 108. Component 108 descends into the syntax tree illustrated by FIG. 3C until it encounters one of the clauses on the predetermined list of clause types. Assuming that, for the example illustrated in FIG. 3C, relative clauses are on the list of predetermined clause types, component 108 descends into the syntax tree until it encounters the node which has been identified by grammatical analyzer 106 as a relative clause. Since that clause type appears in the predetermined list of clause types, component 108 annotates that node (and all terms descending from that node) as being contained in the list of predetermined clause types. This annotation is illustrated in FIG. 3C as an asterisk on the relative clause node but can be any other marker as well. Identifying the predetermined clause types and annotation of those clause types are indicated by blocks 114 and 116 in FIG. 3B.

The annotated syntax tree is then passed to component 104 in FIG. 3A. In an embodiment, for example, where system 100 is determining the similarity between the first and second textual inputs, component 104 can perform a number of operations on the annotated syntax tree. For example, since it has been empirically determined that the annotated terms in the syntax tree do not closely correspond to what the first textual input is about, all annotated terms can simply be pruned from the annotated syntax tree. This is indicated by block 118 in FIG. 3B.

Once the annotated syntax tree has been pruned, and the second textual input has been received, component 104 simply determines the similarity between the terms remaining in the pruned syntax tree and the terms in the second textual input. By way of example, where the first textual input is a document and the second textual input is a query, the content words in the second textual input (the query) are compared against the words remaining in the pruned syntax trees corresponding to the sentences in the document in order to determine whether any matches exist. A score is assigned to the document which is based on the number of matches which occur and which is thus indicative of the similarity between the first textual input (the document) and the second textual input (the query). This score is provided at the output of component 104 for use in further processing. Returning the pruned syntax tree, receipt of the second textual input, and determining the relationship between the first and second textual inputs are indicated by blocks 120, 122 and 124 in FIG. 3B.

As discussed above, component 104 can perform any number of operations on the annotated syntax tree provided by clause marking component 102, other than simply pruning the annotated terms from the syntax tree. FIG. 4 is a flow diagram illustrating an alternative operation in greater detail. A number of blocks are similar to those shown in FIG. 3B, and are similarly numbered. Therefore, system 100 receives the first textual input and performs grammatical analysis to generate a syntax tree, and also identifies the predetermined clause types in the first textual input based on the grammatical analysis. This is indicated by blocks 110, 112 and 114.

However, rather than simply annotating the identified clauses in a binary fashion (as described with respect to FIG. 3B), in the illustrative embodiment shown in FIG. 4, component 108 assigns a weighting value to each of the predetermined clause types identified based upon how closely each clause type is related to the "aboutness" of the first textual input. For example, it may be empirically learned that in a normal type of subordinate clause, the matrix clause is more closely related to the aboutness of the document while the subordinate clause is less closely related to aboutness. However, for clauses which are preceded by a speech act verb (such as "say", "think" or "believe"), the reverse may be true. In that case, the matrix clause may be least related to aboutness while the subordinate clause is most related to aboutness. Therefore, when the clause types have been identified during the grammatical analysis of the textual input, some subordinate clauses may be assigned a very low value (e.g., 0.1 on a scale of 0 to 1) while subordinate clauses which follow a speech act verb may be weighted with a very high value (such as 0.9). Thus, once the clause types are identified by the grammatical analysis component, they are assigned a weighting value which is empirically, or intuitively, predetermined. This is indicated by block 116 in FIG. 4.

The annotated syntax tree is then returned to component 104, as indicated by block 126. Next, as described with respect to FIG. 3B, the second textual input is received as indicated by block 122, and the relationship between the first and second textual inputs is determined by referring to the annotated (weighted) syntax tree, as indicated by block 128.

Summarization and Clustering

The techniques in accordance with the present invention can be used in a wide variety of applications. For example, where the application is to create a summary of a document, the present invention can be used to identify, and eliminate from the summary, clauses or terms which are not related to the aboutness of the document. In that case, system 100 does not include relationship determination component 104 which is used in determining the relationship between first and second textual inputs. Rather, a summary generation component is substituted therefore which is configured to generate a summary based on the annotated or pruned syntax tree returned by component 102.

Similarly, where the application is a document clustering application, system 100 is configured to receive all of the documents to be clustered, and to create annotated syntax trees based on sentences in each of the documents. Then, relationship determination component 104 simply takes, as its inputs, annotated syntax trees from two or more documents to determine a relationship between the two documents. Relationship scores are computed for all possible pairs of documents, and those with the highest relationship scores are clustered together.

Information Retrieval Prior to Indexing

While all of the above applications can be referred to as information retrieval-type tasks, the present invention can also illustratively be implemented in an application which performs information retrieval within a computer, across a local area network, or across a wide area network, such as a global computer network. FIGS. 5A–5F illustrate use of the present invention in information retrieval operations in the context of a global computer network, wherein techniques according to the present invention are performed prior to indexing.

FIG. 5A is a functional block diagram setting clause marking component 102 (described with respect to FIG. 3A) in the context of Internet information retrieval system 200. System 200 includes web crawler component 202, text filter component 204, clause marking component 102, indexer 206 and index 208. System 200 also illustratively includes search engine 210. FIG. 5B is a flow diagram which illustrates the operation of system 200.

Web crawler component 202 is a conventional component which periodically accesses predetermined sites on the global computer network and ascertains whether any content has been added to the site which has been accessed. If so, web crawler component 202 provides the content to text filter 204. Text filter 204 is also a conventional component which removes items which are undesirable from an indexing standpoint. For example, in one illustrative embodiment, text filter component 204 removes all HTML tags, and other such items, from the information provided by web crawler 202. Receiving the web content information is indicated by block 212 in FIG. 5B, and filtering the text is indicated by block 214 in FIG. 5B. The filtered information is then provided to clause marking component 102.

Clause marking component 102 operates in a similar fashion to that described with respect to FIG. 3A. In other words, clause marking component 102 illustratively includes a sentence breaker which breaks the text provided at its input at sentence boundaries. Component 102 also preferably includes grammatical analysis functionality which parses the sentences and provides an output which identifies clause types and subordinations (or syntactic dependencies). Component 102 also illustratively includes clause identifier and annotator 108 which descends into the syntax tree provided by the grammatical analyzer to determine whether any of the predetermined clause types are contained in the syntax tree. If so, those clause types are annotated. In addition, those clause types can be pruned or annotated with a weighting value as discussed above. Identifying and annotating the predetermined clauses is indicated by block 216 in FIG. 5B.

The terms in the annotated or pruned syntax tree are then provided to indexer component 206. Indexer 206 can take any number of suitable forms, such as being incorporated in search engine 210 described below and as described in greater detail with respect to FIGS. 5C–5F below. However, suffice it to say that indexer 206 generates an index corresponding to the documents retrieved by web crawler component 200 and provides the index 208 at its output. Index 208 can be a simple statistical, keyword-type index, or a more sophisticated type of index, depending upon indexer 206. Generation of the index is indicated by block 218 in FIG. 5B.

Search engine 210 is configured to receive a user input query and to execute that query against index 208. In one illustrative embodiment, search engine 210 also performs the indexing operation described with respect to indexer 206. In such an embodiment, search engine 210 is an Internet search engine, such as Alta Vista (which is a registered trademark of Digital Equipment Corporation of Maynard, Mass.), and is connected to a mass data store containing index 208. The data set of document records is illustratively indexed by indexer 206 which can be contained in the search engine. Each such record in index 208 typically contains a web address (commonly referred to as a uniform resource locator "URL") at which a corresponding document can be accessed by a web browser, predefined content words which appear in that document along with, in certain engines, a relative address of such word relative to other content words in that document; a short summary (often just a few lines) of the document or a first few lines of the document; and, possibly, the description of the document as provided in its hypertext markup language (HTML) description field.

When a user enters the query through, for example, a web browser, the browser passes the query through an Internet connection to a server which contains the search engine 210.

The search engine 210 processes the query against document records stored within index 208 to yield a set of retrieved records (for documents) that the engine 210 determines to be relevant to the query.

In one embodiment, search engine 210 compares the content words in the query against content words in document records indexed in index 208. Based on the number of matches, the documents are assigned a score and ranked. The ranked documents are output to the user by search engine 210. Receiving and executing the query is indicated by blocks 220 and 222 in FIG. 5B, and returning the documents is indicated by block 224.

Of course, it should be noted that search engine 210 can be a more complex type of search engine. In that case, search engine 210 may perform natural language processing on the query, or on the returned documents, or on both, prior to providing any documents to the user. Other types of search engine are contemplated as well.

FIG. 5C is a more detailed block diagram of indexer 206 in accordance with one illustrative embodiment of the present invention. In FIG. 5C, indexer 206 includes clause pruner component 226 and index generator component 228. In the embodiment illustrated in FIG. 5C, the index 208 to be generated is simply a statistical keyword type index, and index generator 228 is a conventional index generator for generating such an index based on a textual input. In that case, clause pruner 226 operates to prune, or strip out, all annotated clauses or terms which are provided by clause marking component 102, and to provide the remaining terms to index generator 228. Therefore, all aspects of system 200, including index generation, can be accomplished with conventional components. The textual inputs are simply provided to clause marking component 102, and clause pruner 226, after they have been filtered by component 204, and prior to indexing by index generator 228. Components 102 and 226 act to identify and eliminate from indexing, terms and clauses which have little or no relationship to the aboutness of the document being indexed. This significantly reduces the size of index 208, without compromising performance across the precision and recall dimensions. For example, it has been observed that, by utilizing the present invention, the index size can be reduced by approximately 20% with no statistically significant impact on either precision or recall.

FIG. 5D is a flow diagram which illustrates the operation of indexer 206 shown in FIG. 5C. Pruning the annotated clauses is indicated by block 230 in FIG. 5D, and indexing the remaining terms using conventional indexing techniques is indicated by block 232 in FIG. 5D.

FIG. 5E is a functional block diagram illustrating another illustrative embodiment of indexer 206, and FIG. 5F is a flow diagram illustrating the operation of indexer 206 shown in FIG. 5E. Indexer 206 in FIG. 5E includes term weighting component 234 and index generator 236. Term weighting component 234 receives the annotated syntax tree from component 102 and weights the terms in the annotated syntax tree, or weights certain of the terms. The weighting can be accomplished using a binary type scale or a continuous scale.

For example, term weighting component 234 can be configured to simply add a predesignated marking to all words in the syntax tree. In other words, all words in the predetermined syntax tree which are not located within the predetermined annotated clause can be prepended with a "g_" indicating that those words represent a good match. Similarly, all words contained within the predetermined clauses in the syntax tree can be prepended with a "b_" indicating that they correspond to a bad match, or a match which does not necessarily indicate that the two textual inputs are similar.

By way of example, if "dog" is a word contained in the syntax tree outside of the predetermined clause type, term weighting component 234 receives the term "dog" and generates at its output the term "g_dog", which is indexed. Similarly, if the term "bone" is located within the predetermined clause in the syntax tree, then weighting component 234 receives the term "bone" at its input and generates at its output the term "b_bone". All of these terms are provided to index generator 236 which, in that embodiment, simply generates a statistical keyword type index using the words with the prepended terms.

Then, when the user provides the query to search engine 210, search engine 210 is configured to prepend each content word in the query with the term "g_". Search engine 210 then identifies matches between only terms in the index and query which represent a good match. If needed, for example, when there are very few good matches, search engine 210 can be configured to prepend the content words with the term "b_" and search for matches which may represent less relevant matches.

Again, it should be noted that index generator 236 can, in that embodiment, be implemented as a conventional index generator which simply generates a keyword-type index 208 without any special modification. In the above-described embodiment, index 208 does not achieve the space reduction advantages which are achievable using the present invention, but it does achieve increased precision advantages in accordance with the present invention.

In an alternative embodiment, term weighting component 234 weights the terms in the annotated syntax tree received from component 102 with a continuous, or semi-continuous weighting scheme. In that case, term weighting component 234 is configured to place a weight by each annotated clause, or by each annotated term, indicating the expected relevance which the clause or term has to the aboutness of the document, based on empirical analysis. For example, if empirical results show that a certain clause type is highly related to the aboutness of a document, a weight can be appended to the terms in that clause which indicates, for example, a 90% confidence level. This weight is added to the terms in the annotated clause by term weighting component 234.

Index generator 236, in that case, is configured to create index 208 which not only includes the terms provided to index generator 236, but which also includes the weight value added by term weighting component 234. Thus, search engine 210 is configured to not only look for matches between content words in the query and those contained in index 208, but to compute the score for similarity between the document and the query based on the number of matches found (and any other desirable criteria) and also based on the weight assigned to the matching terms.

In another alternative embodiment, an existing indexing technique is used, with the addition of one item. A number of existing indexing techniques index a document based on the word, the position of the word within the document, and the case (upper or lower) of the word. This type of indexing scheme can be used in accordance with the present invention including term weighting component 234 by simply adding one additional entry into the index. That entry corresponds to the weight value assigned by term weighting component 234. The weight can be empirically determined, or can be determined using a conventional technique such as term frequency inverse document frequency (tf.idf). In any case, term weighting component 234 provides the weight value to index generator 236 which builds the index based on the term, the position, the case and the assigned weight value, and any other conventional entries used in the indexing scheme. Weighting the terms or clauses based on the annotation is indicated by block 238 in FIG. 5F, and generation of the index including the weighting information is indicated by block 240.

Information Retrieval Operations, Performed on Documents Returned in Response to a Query The present invention can also be used in post processing operations (i.e., in operations performed on the document set returned by a conventional search engine in response to a query). FIG. 6A is a functional block diagram illustrating clause marking component 102 in the context of a post processing information retrieval system 300. System 300 includes a conventional information retrieval engine 302 which can be implemented as a simple statistical information retrieval engine, or as one which includes more complex natural language processing techniques, such as logical form generation and indexing using logical forms, etc. Data store 304 represents the data store being searched based upon a user query input to information retrieval engine 302. Data store 304 can, for example, be within a computer, on a local area network, or on a wide area network (such as a global computer network). Similarly, data store 304 can simply be an index of documents to be searched. System 300 also includes clause pruner component 306 or, optionally, clause weighting component 308. System 300 further includes matching component 310 and re-ranking component 312.

FIG. 6B is a flow diagram which illustrates the operation of system 300 shown in FIG. 6A.

In operation, information retrieval engine 302 first receives a query input by the user. This is indicated by block 314 in FIG. 6B. Next, information retrieval engine 302 executes the query against the data store 304 in a conventional manner. This is indicated by block 316 in FIG. 6B. Similarly, in a conventional manner, information retrieval engine 302 receives and returns the documents which are deemed by engine 302 to be relevant to the user's query. This is indicated by block 318.

In accordance with one embodiment of the present invention, the returned documents are then provided to clause marking component 102 which is similar to that described with respect to FIG. 3A. The annotated clauses are then provided, in one illustrative embodiment, to clause pruner 306. Clause pruner 306 prunes the annotated clauses from the syntax trees provided by clause marking component 102. The pruned syntax trees are then provided to matching component 310. Identifying and annotating the predetermined clauses is indicated by block 320 in FIG. 6B, and pruning those clauses is indicated by block 322.

Matching component 310 selects a first of the returned documents, with the annotated clauses removed therefrom. This is indicated by block 324. Matching component 310 then determines whether any of the content terms in the query provided by the user are still in the selected document, after the annotated terms have been removed. If not, that indicates that the only matches against the selected document occurred with respect to terms or clauses which were in the list of predetermined clauses (i.e., those which have little to do with describing what the document is about). This is indicated by block 326 in FIG. 6B.

That being the case, the document is eliminated from the list of returned documents, as indicated by block 328, and matching component 310 determines whether any documents remain in the returned documents. This is indicated by block 330.

If, at block 326, some of the content terms in the query are still found in the selected document, after the annotated terms and clauses have been removed therefrom, that indicates that matches have been made against the document with respect to terms that are believed to be relevant to the aboutness of the document. Therefore, the selected document is retained as indicated by block 332. Again, matching component 310 determines, at block 330, whether any of the returned documents have yet to be analyzed. If so, processing returns to block 324.

After all of the returned documents have been analyzed, the remaining documents (those which have not been eliminated) are passed to re-ranking component 312. Re-ranking component 312 first determines whether the number of remaining documents is sufficient to present to the user. This is indicated by block 334. In other words, it is possible that the content terms of the query matched relevant terms in only a very small number of the returned documents. If that is the case, re-ranking component 312 may determine that the number of documents presented to the user is undesirably low, or is insufficient. This threshold can either be set by the user, or can be automatically determined based on a threshold value preprogrammed into component 312.

In any case, if the number of documents remaining is sufficient, as determined at block 334, then re-ranking component 312 computes a new score for the retained documents. The new score can be computed in any suitable fashion. For example, the new score may be based on the number of matches between content words in the query and terms remaining in each of the documents, after the annotated terms have been removed. Computation of the new score is indicated by block 336. Based upon the new score, re-ranking component 312 re-ranks the retained documents in an order determined by the new score. This is indicated by block 338. Finally, component 312 returns the re-ranked documents to the user in re-ranked order. This is indicated by block 340.

If, at block 334, it is determined that an insufficient number of documents remain to present to the user, then processing continues at block 342. In that case, re-ranking component 312 retrieves all documents returned from information retrieval engine 302 in response to the query input by the user. Instead of removing the annotated clauses as indicated by block 322, re-ranking component 312 feeds the documents back to optional clause weighting component 308. Clause weighting component 308 weights the annotated terms or phrases which had previously been removed. The weighted syntax trees are then fed back to matching component 310 which again matches the content words in the query against the terms in the documents, including annotated terms which have been weighted. This is indicated by block 344. A new score is then computed for each of the returned documents based on the weights, and the documents are again re-ranked. This is indicated by block 346. The documents are then provided to the user as indicated by block 340.

It should also be noted that, at block 344, instead of weighting the annotated clauses, clause weighting component 308 can simply remove the annotations which essentially weights all the terms the same. Then, matching component 310 simply matches against the same terms which information retrieval engine 302 matched against. Further, rather than removing the annotations from all documents, the annotations can simply be removed at block 344 from those documents which were eliminated from the search at block 328. Therefore, the annotations are simply removed from those documents which information retrieval engine 302 had already determined were relevant enough to return to the user. Those documents are then simply ranked lower than the documents which remained even with the annotated terms removed.

Test Methodology

One embodiment of the present invention also includes a system by which clauses can be predetermined based on any given data set with which the present invention is utilized. FIG. 7 is a flow diagram which illustrates operation of computer 20 in implementing such a system. It should be noted that a content set can be any suitable collection of documents or any other text corpus which can be searched using information retrieval-type techniques.

First, a clause type is selected. A clause type can be any of a wide variety of clause types. However, it has been observed that certain subordinate clauses tend to be less relevant to the aboutness of a document than other subordinate clauses. It should also be noted that complete clauses need not be identified. Instead, parts of clauses, identified by statistical or heuristic techniques, can be used (e.g, techniques that tag part of speech and then identify fragments of clauses). However, it is believed that whole clauses provide better results. For the purposes of the present invention, the term clauses shall include full clauses and clause fragments. In any case, it has been observed that the particular predetermined clauses which yield significantly better results than other clauses include abbreviated clauses which are defined as a subordinate clause introduced by a subordinating conjunction and with no logical subject. An example of an abbreviated clause includes "Until further indicated, . . . ". A simple string search strategy for locating such clauses looks for a sentence initial subordinating conjunction and takes the text up to the first comma as the abbreviated clause.

A second subordinate clause which has been observed to be particularly helpful is a subordinate clause introduced by a subordinating conjunction and with a subject. Such subordinate clauses include "[After John went home,] he ate dinner";

John ate dinner, [after he went home.]; John stayed at work [until it got dark.]

A simple string matching strategy to identify such subordinate clauses can include a sentence-initial subordinating conjunction followed by a noun up to the first comma, or a comma followed by a subordinating conjunction followed by a noun up to the end of the first sentence.

Another kind of subordinate clause which has been observed to be particularly useful is an infinitival clause which, in English, is a clause, which is introduced by the word "to". An example of such a clause includes "John decided [to go home].", and "[To achieve his objectives,] John had [to work hard]". In accordance with one aspect of the present invention, all infinitival clauses are either pruned or downgraded in weight although distinguishing between different types of infinitival clauses and pruning or weighting them differently may also improve results. Two string matching techniques for identifying infinitival clauses can include identifying a sentence initial "to" followed by a verb up to the first comma, or non-sentence-initial "to" followed by a verb up to the end of the sentence.

Another kind of subordinate clause which has been observed to be significant is a participial clause that is not introduced by a subordinating conjunction. In the English language, a verb having a suffix "ing" is an example of a verb in a participial clause. Examples of such participial clauses include "[Running home,] John fell over." and "Napoleon attacked the fleet [, completely destroying it.]"

Simple string matching techniques which can be used to identify participial clauses include sentence initial verbs ending in "ling", up to the first comma, or a comma (followed optionally by one or more adverbs) followed by a verb ending in "ing", up the end of the sentence.

In any case, it is believed that the particular types of clauses or fragments of clauses which may prove to be helpful in performing techniques in accordance with the present invention may change with different content sets. Therefore, in order to identify the clauses to be used in accordance with the present invention, as the predetermined clause types, a first type of clause to be tested is selected. This is indicated by block 350 in FIG. 7.

Next, an index is built from a predetermined text corpus with all of the selected clauses removed therefrom. This is indicated by block 352. In accordance with one illustrative embodiment of the present invention, the text corpus is approximately 30,000–40,000 documents pertaining to the desired content set.

Next, information retrieval is performed on the index. This is indicated by block 354. In one illustrative embodiment, information retrieval is performed using approximately 500 predetermined queries.

Next, computer 20 determines how much of an index space saving has been realized by removing the selected clause type from the document corpus. This is indicated by block 356. Computer 20 then determines the performance of the information retrieval operations performed against the index. This is indicated by block 358. In order to determine whether performance is adequate, any suitable measure which includes precision and recall components can be used. One suitable measure is known as "F-measure" and was defined in a book written by C. J. Van Rijsbergen, 1979, entitled "INFORMATION RETRIEVAL." The F-measure is defined as follows:

$$F=((B^2+1.0)*P*R)/(B^2*P+R)$$

where P is precision, R is recall and B is the relative importance given to recall over precision. usually, B=1.

Next, computer 20 determines whether the performance is adequate given the reduction in index size. This will differ, of course, with application. In applications in which index size is of great importance, a greater reduction in information retrieval performance may be tolerated. For purposes of the present invention, a statistically significant change in F-measure can be defined as a change of five percent or more.

In any case, it is decided whether the performance is adequate given reduction in index size at block 360. If so, the selected clause type is added to the list of predetermined clause types associated with the content set under analysis. This is indicated by block 362.

However, if, at block 360, it is determined that performance is not adequate given the reduction in index size, the clause type is not added to the list of predetermined clause types. Instead, failure analysis is performed to determine why documents were not returned that should have been, or why documents were returned that should not have been. This is indicated by block 364. Illustratively, this is determined by a group of linguists who analyze the documents returned, or documents which should have been returned, but were not, to determine what the documents have in common, and hence to determine why the documents were not returned, or were incorrectly returned. In performing this analysis, the linguists may add some further condition to the selected clause such that it is only removed under certain circumstances, or in certain contexts. For example, the linguist may decide that the selected clause should only be omitted if it has a non-human subject. Similarly, the linguists may simply determine that the selected clause is not a desirable clause to be removed given the content set. In any case, computer 20 then determines whether additional clauses are to be tested. If so, processing returns to block 350. If not, all clause types which are to be tested have been tested, and the list of predetermined clause types has been formed. This is indicated by block 366.

Thus, it can be seen that the present invention identifies certain clauses which can be annotated, weighted, or simply removed when determining what a document is about. This can be utilized when a document is indexed during information retrieval, when a document is being summarized, after a document has been retrieved using conventional information retrieval techniques, when documents are to be clustered, or with an implicit query in which a document is provided and a computer is requested to find similar documents. The present invention can be utilized in other contexts as well. However, it has been found to be particularly beneficial in information retrieval indexing since the present invention can greatly reduce the index size without sacrificing performance.

Although the present invention has been described with reference to preferred embodiments, workers skilled in the art will recognize that changes may be made in form and detail without departing from the spirit and scope of the invention.

What is claimed is:

1. A method of determining a relationship between first and second textual inputs, the method comprising:

identifying clauses in the first textual input based on clause type, the identified clauses being of clause types that have predetermined characteristics indicative of usefulness in determining the relationship; and determining the relationship based on the clauses identified.

2. The method of claim 1 wherein determining the relationship comprises:

determining the relationship based on terms in the second textual input and terms in the first textual input other than those in the identified clauses.

3. The method of claim 2 wherein the first textual input comprises a document and further comprising:

providing an index having an index entry corresponding to the document, the index entry including terms in the document found outside the identified clauses.

4. The method of claim 3 wherein determining the relationship comprises:

determining similarity between the first and second textual inputs based on the terms in the second textual input and terms in the index.

5. The method of claim 1 and further comprising:

annotating the identified clauses with weighting values; and in an index, providing an index entry corresponding to the first textual input, the index entry including the identified clauses and the weighting values.

6. The method of claim 5 wherein determining the relationship comprises:

determining a similarity between the first and second textual inputs based on terms in the second textual inputs and corresponding terms in the index, and based on the weighting values.

7. The method of claim 1 wherein the first textual input comprises a document returned from an information retrieval system in response to a query which comprises the second textual input, and wherein determining the relationship comprises:

determining a similarity between the query and the document.

8. The method of claim 7 wherein the steps of identifying clauses and determining the relationship are repeated for each of a plurality of documents returned by the information retrieval system, and further comprising:

ranking the plurality of documents based on the relationship determined for each of the plurality of documents.

9. The method of claim 1 wherein identifying clauses comprises:

identifying syntactic dependencies in the first textual input; and determining whether the syntactic dependencies correspond to clauses having the predetermined characteristics.

10. The method of claim 9 wherein identifying syntactic dependencies comprises:

performing grammatical analysis on the first textual input to break the first textual input at sentence boundaries and to perform a grammatical analysis associated with each sentence.

11. The method of claim 10 wherein the grammatical analysis results in a syntax tree and further comprising:

pruning the syntax tree to eliminate branches corresponding to identified clauses, and wherein determining the relationship comprises determining the relationship based on the pruned syntax tree.

12. The method of claim 10 wherein the grammatical analysis results in a syntax tree and further comprising:

annotating branches of the syntax tree corresponding to identified clauses, and wherein determining the relationship comprises determining the relationship based on the annotated syntax tree.

13. The method of claim 1 wherein the first textual input comprises a portion of a document and the second textual input comprises a portion of a text corpus.

14. The method of claim 1 wherein the first and second textual inputs each comprise documents and wherein determining the relationship comprises determining a similarity in meaning between the documents.

15. The method of claim 14 wherein determining the relationship further comprises determining whether the first and second textual inputs are to be clustered in a logical cluster based on the similarity between the first and second documents.

16. A computer readable medium storing an index of textual material used for determining a relationship between first and second textual inputs, the index comprising a data structure including:

a plurality of terms from the textual material, the plurality of terms having words contained in clauses in the textual material removed therefrom, the clauses being of clause types having predetermined characteristics indicative of usefulness in determining the relationship.

17. The computer readable medium of claim 16 wherein the textual material includes a plurality of sentences, and wherein the index comprises:

a tree structure corresponding to each of the plurality of sentences, each tree structure being indicative of syntactic dependencies representing clauses in the corresponding sentences.

18. A computer readable medium storing an index of textual material used for determining a relationship between first and second textual inputs, the index comprising a data structure including:

a plurality of terms from the textual material, the plurality of terms having words contained in predetermined types of clauses in the textual material having predetermined characteristics indicative of usefulness in determining the relationship being annotated therein.

19. The computer readable medium of claim 18 wherein the textual material includes a plurality of sentences, and wherein the index comprises:

a tree structure corresponding to each of the plurality of sentences, each tree structure being indicative of syntactic dependencies representing clauses in the corresponding sentences, and wherein the syntactic dependencies representing the predetermined clause types are annotated in the tree structure.

20. The computer readable medium of claim 19 wherein the predetermined clause types are annotated with a binary type annotation.

21. The computer readable medium of claim 19 wherein the predetermined clause types are annotated with a weight value indicative of the usefulness of the predetermined clause types in determining the relationship.

22. A method of generating an index corresponding to a textual corpus, the index for use in determining a relationship between portions of the textual corpus and a textual input, the method comprising:

identifying clauses in the textual corpus as being of clause types having predetermined characteristics indicative of usefulness in determining the relationship; and generating the index based on the clauses identified.

23. A method of identifying clause types corresponding to clauses in a textual input, wherein the clauses have predetermined characteristics indicative of usefulness in determining a meaning of the textual input, the method comprising:

(a) selecting a clause type;

(b) removing all clauses of the selected clause type from the textual input;

(c) providing an index corresponding to the textual input with the clauses removed;

(d) performing information retrieval operations on the index;

(e) determining a reduction in a size of the index achieved by removing the clauses;

(f) determining performance of the information retrieval operations; and (g) if performance is adequate, given the reduction in the size of the index, identifying the selected clause as a clause having the predetermined characteristics of usefulness.

24. The method of claim 23 wherein identifying comprises:

adding the selected clause to a list of clause types having the predetermined characteristics.

25. The method of claim 23 and further comprising:

repeating steps (a)–(g) until all desired clause types have been selected.

26. The method of claim 23 and further comprising:

if performance is inadequate, conducting failure analysis to determine whether the selected clause type should be conditionally identified as a clause having the predetermined characteristics.

27. The method of claim 23 and further comprising performing steps (a)–(g) in the order listed.

* * * * *

UNITED STATES PATENT AND TRADEMARK OFFICE
CERTIFICATE OF CORRECTION

PATENT NO.     : 6,295,529 B1
DATED          : September 25, 2001
INVENTOR(S)    : Simon H. Corston-Oliver et al.

It is certified that error appears in the above-identified patent and that said Letters Patent is hereby corrected as shown below:

Column 6,
Line 7, "are" should be -- area --.

Column 8,
Lines 35-36, Title of Application Serial Number 08/886,814 should be in all caps.

Column 13,
Lines 19 and 46, "SC" should be -- 5C --.

Column 15,
Lines 11-12, should be centered [Title].
Line 12, "Ouery" should be -- Query --.

Signed and Sealed this

Thirtieth Day of April, 2002

Attest:

Attesting Officer

JAMES E. ROGAN
Director of the United States Patent and Trademark Office